United States Patent [19]

Falbesaner et al.

[11] 4,234,422
[45] Nov. 18, 1980

[54] PROCESS FOR REMOVAL OF MERCURY AND MERCURY COMPOUNDS FROM AQUEOUS SOLUTIONS AND INDUSTRIAL WASTE LIQUORS

[75] Inventors: Egon Falbesaner, Burghausen, Fed. Rep. of Germany; Josef Bichler, Duttendorf, Austria; Eberhard Wimmer, Burghausen, Fed. Rep. of Germany

[73] Assignee: Wacker-Chemie GmbH, Munich, Fed. Rep. of Germany

[21] Appl. No.: 34,314

[22] Filed: Apr. 30, 1979

[30] Foreign Application Priority Data

May 2, 1979 [DE] Fed. Rep. of Germany ....... 2819153

[51] Int. Cl.$^3$ .................................................. C02F 1/70
[52] U.S. Cl. ..................................... 210/713; 210/719
[58] Field of Search ............. 210/28, 42 R, 50, 51–53, 210/80

[56] References Cited

U.S. PATENT DOCUMENTS

| 3,171,800 | 3/1965 | Rice et al. ........................... 210/53 X |
| 3,630,892 | 12/1971 | Hirs et al. ........................... 210/80 X |
| 3,680,701 | 8/1972 | Holca ...................................... 210/80 |
| 3,736,253 | 5/1973 | DeAngelis et al. ................ 210/50 X |
| 3,764,528 | 10/1973 | Cadmus .................................. 210/50 |
| 3,929,634 | 12/1975 | Schuller ............................. 210/51 X |

Primary Examiner—Thomas G. Wyse
Attorney, Agent, or Firm—Allison C. Collard; Thomas M. Galgano

[57] ABSTRACT

A process for the removal of mercury and mercury compounds from aqueous solutions and, in particular, industrial waste liquors, by reduction and filtration, wherein after reduction, the liquors are cleared by letting the mercury particles and dirt particles flow into a settling basin. Subsequently, the supernatant aqueous solution from the settling basin is subjected to filtration in a deep filter with a filtering agent having a grain size of 0.02 mm to 2 mm and preferably 0.04 mm to 0.6 mm, whereupon the mercury is returned by reverse rinsing into the settling basin from the filter and is separated in the settling basin.

5 Claims, No Drawings

PROCESS FOR REMOVAL OF MERCURY AND MERCURY COMPOUNDS FROM AQUEOUS SOLUTIONS AND INDUSTRIAL WASTE LIQUORS

The invention relates to a process for the removal of mercury from aqueous solutions and, in particular, industrial wastes.

Mercury-containing waste liquors from industrial plants are very dangerous for the environment due to their metallic or ionogenic mercury content. The emission of mercury from industrial plants has, therefore, been maintained at as low a level as possible. Among the plants from which mercury is emanating, are e.g. electrolytic alkali chloride plants which operate according to the amalgamation process.

It has been proposed, among other processes, to remove mercury from industrial waste liquors by ion exchange (CH Pat. No. 330 863) or by extraction (German Offenlegungsschrift No. 27 18 457.) However, these methods have the disadvantage that initially ever-present dirt particles have to be removed from the waters to be purified.

Mercury precipitation processes which are carried out by formation of low-solubility mercury compounds or metallic mercury, have the shortcoming that the filtration can only be brought about effectively by the use of filtering aids. In U.S. Pat. No. 3,764,528 precipitation of metallic mercury is proposed by reduction with sodiumboronhydride and adsorptive flotation filtration over activated carbon; in the reduction process disclosed in German Offenlegungsschrift No., 19 58 169 hydrazine is used together with flocculating agents, e.g. calcium chloride or aluminum sulfate, before the filtration step. Another process is described in German Offenlegungsschrift No., 26 13 128, wherein mercury is flocculated out of the waste liquor with the 10–100 fold excess of iron (II) salts as difficulty soluble mercury (I) salt.

The above-mentioned processes are not applicable to ionogenic or metallic mercury impurities from waste liquors and, moreover, have the shortcoming that the mercury content in the dry substance of the filter cake is so low that an economical processing of the filter cake means very high costs.

It is the object of the present invention to provide a process for the removal of mercury from aqueous solutions which can be carried out without auxiliary filtration agents and with the use of tested reduction methods for ionogenic mercury impurities, leading to an economic purification of industrial waste liquors from mercury impurities. Other objects and advantages will become apparent from the following description.

These objects can be fulfilled according to the invention, by carrying out reduction of the mercury particles and filtration in such a manner that, after the reduction step, mercury particles as well as dirt particles are allowed to settle in a basin or tank and, subsequently, the supernatant aqueous solution is subjected to a filtration in a deep filter with a filtering agent or medium having a grain size of 0.02 to 2 mm, preferably 0.04 to 0.6 mm, whereupon the mercury is returned from the filter into the settling basin by reverse rinsing, and is brought to deposition in the settling basin. It is particularly advantageous to use in the filtration step quartz sand as a filtering agent, especially when a sand of uniform grain size is used.

It is surprising that in the process according to the invention, the mercury, which is present is a finely-dispersed, quasi-colloidal state in the settling basin, where it is maintained suspended in an aqueous solution, can be removed by filtration in a deep filter with a filtering agent having a grain size of 0.02 to 2 mm, especially 0.04 to 0.6 mm, and passed into the settling basin by reverse rinsing where the mercury is then deposited and can thus be removed. The possibility of reverse rinsing of the mercury-particle-laden deep filter agent is all the more surprising, as the mercury of higher specific weight is rinsed out of the filter during an eddy formation in the reverse rinsing against the effect to be expected due to the difference in densities.

The process is carried out by first converting the ionogenic mercury present in the waste liquor into the metallic state by one of the known reduction processes, e.g. by means of hydrazine, hydroxylamine, or sodiumboronhydride. This is done in general by adding the reducing agent to the waste liquor in the settling basin while stirring, while the pH value of the waste liquor is controlled and e.g. adjusted to a value between 7 and 11, for instance by means of pH electrodes. Subsequently, a pre-clearing of the waste liquor is carried out in a settling basin, in which coarse mercury particles dispersed in the liquor and other impurities, e.g. dirt particles, are segregated. The time in the settling basin varies between 2 hours and 2 days. Preferably a settling basin is used which has a larger depth than width.

The so pre-purified waste liquor is then subjected to a filtration in depth for the removal of finely dispersed mercury particles, if necessary with a pH adjustment to 7–11. For carrying out this step, the waste water from the settling basin is pumped to the depth filter e.g. by a so-called pontoon pump. The filter consists preferably of a conventional sand filter, comprising a pressure vessel with an inset nozzle bottom. On the bottom, the filtering agent is filled to a height of between 20 and 80 cm. The agent consists of grains of an average size of 0.02 to 2 mm and as mentioned above, preferably of 0.04 to 0.6 mm. While quartz sand is the preferred medium, other fine-grained inert materials may also be used, e.g. zirconium sand, either alone or in mixture with quartz. The filtering medium may be of uniform grain size, or of a mixture of varying sizes. It is further possible that layers of small particle size alternate with layers of larger particle size. Preferably the filtering medium comprises an upper, fine-grained sand layer and an underlying coarser-grained sand layer, wherein fine-grained and coarse-grained are to be understood by the above definition. The filtrate is withdrawn below the nozzle bottom. During the filtering process, the rate of current is between 5 m and 25 m per hour in the medium. The process according to the invention makes it possible to filter the waste liquor practically free of mercury; residues amounting to less than 0.05 mg Hg/liter liquor.

Another feature of the process consists of returning the mercury collected in the depth filter during the filtration; this is done by reverse rinsing, namely reversing the flow and thereby preparing the filter medium for a renewed filtration. For the reverse rinsing, an eddy is formed in the pressure vessel of the filter at a flow rate of between 10 and 30 m/hour which causes the mercury adsorbed by the filtering medium to be removed in a short time and returned into the settling basin. The depth filter is thereby readied for renewed filtration of fine-grained mercury. After this filtration step, the fine-grained mercury is agglomerated to an extent that it will be deposited in the settling basin. It was never observed that the liquor leaving the settling basin showed a higher mercury content after the filter had been subjected to reverse rinsing.

By the installation of two parallel filters, a continuous operation can be accomplished, one of the filtering devices being ready in reserve most of the time, since the reverse rinsing of a filter is completed after at most, half an hour.

The process of the invention will now be more fully described in a number of examples which are given by way of illustration and not of limitation.

EXAMPLE 1

The waste liquor of an alkali chloride-electrolysis carried out according to the amalgam method was passed in a constant amount of 4.3 m$^3$ per hour into a settling basin having a capacity of 180 m$^3$, and the same amount 4.3 m$^3$ per hour of clarified waste water was withdrawn at the other end of the plant by means of a pontoon pump at 30 cm below the water surface. During the entire test period the filling height in the settling basin was 3.10 m. The crude waste water had a pH value of 12.1 which was adjusted to pH 9 by means of hydrochloric acid. Ionogenic mercury was reduced by hydrazine in such a manner that into the water flow to the settling basin so much of a 2% hydrazine solution was added that after filtration the purified water still contained 0.3 mg/liter hydrazine. The filtering layer above the nozzle bottom of the device was composed of 20 cm quartz sand of 1–2 mm grain size and, on top of this, 40 cm quartz sand with a grain size 0.1–0.4 mm. The filtration rate was 8.6 m$^3$ per hour. The pressure loss in the filter layer was 0.1 bar at the start of the test and rose slowly. After 176 hours of operation, the differential pressure was 2 bar and the test was completed. The total through-flow of waste liquor was 755 m$^3$. The mercury content of the waste liquor at the various check points during the entire test were within narrow limits and amounted to:

Feed-in to the settling basin: 16.8 to 17.5 mg Hg/l
Outflow from the settling basin: 5.9 to 6.3 mg Hg/l
Waste liquor after filtration: below 0.05 Hg/l The reverse rinsing of the filter was done with an amount of water of 3.2 l/sec. corresponding to an upward flow of 0.64cm/sec. calculated for the empty filter. At the viewing window one observed that the reverse-rinsing water was strongly dirtied and of gray-black color, while after completed reverse rinsing of 20 minutes it ran off clear.

After having operated the sand filter with 32-times of reverse rinsing, a sample of sand was taken from the filter immediately after a reverse-rinsing and was tested for mercury. The mercury value found was 0.13% and showed that an adhesive bonding of mercury to quartz sand was effectively offset in the reverse rinsing.

EXAMPLE 2

The grain size of the sand for the filter was changed, but otherwise the method used was the same as described in Example 1.

Bottom filling of the quartz sand 20 cm: Grain size 1–2 mm
Above filling of the quartz sand 10 cm: Grain size 0.1–0.6 mm
Above filling of the quartz sand 30 cm: Grain size 0.04–0.2 mm The filter was operated for 95 hours with a continuous through-put of 4.1 m$^3$/hour corresponding to 390 m$^3$ of filtered waste water. The mercury content of the waste water was:

Feed-in to the settling basin: 13.8 to 14.3 mg Hg/l
Outflow from the settling basin: 6.8 to 7.4 mg Hg/l
Waste liquor after filtration: 0.03 to 0.04 mg Hg/l Reverse-rinsing of the filter was carried out with a water amount of 1.5 l/sec according to an upward flow of 0.3 cm/sec. 15 minutes passed until the outflow was clear.

EXAMPLE 3

As reducing agent for ionogenic mercury, sodium hydride was used, namely a 0.6% aqueous alkaline solution. Otherwise the procedure of Example 1 was followed. The mercury content of the waste water was as follows:

Feed-in to the settling basin: 15.2 to 16.3 mg Hg/l
Outflow from the settling basin: 3.5 to 4.1 mg Hg/l
Waste liquor after filtration: 0.02 to 0.03 mg Hg/l Operating time of the filter until reverse rinsing was completed, 141 hours.

EXAMPLE 4

A comparison test was made to establish the adhesive effect of different metals to metallic mercury. A glass tube having a height of 60 cm and a diameter of 3.5 cm was closed with a coarse-pored frit and was filled with quartz sand of a grain size of 0.1–0.2 mm to a height of 40 cm. A second glass tube, identically arranged, was filled with zirconium sand (silicate) having a grain size of 0.1 to 0.2 mm. To both tubes, pre-clarified waste liquor of pH 9.5 was applied having a mercury content of 12.3 mg/l and a hydrazine excess of 3.1 mg/l, both uniformly with 5 l/h. Samples of the filtrates were taken hourly, over a time of 6 hours. The combined filtrates of both filters were analyzed for mercury. The average values were with filtration through quartz sand: 0.040 mg Hg/l
through zirconium sand: 0.033 mg Hg/l.

Thus, zirconium shows a better adhesion to metallic mercury.

Thus, while only several examples have been described, it will be obvious to those persons of ordinary skill in the art, that many changes and modifications may be made thereunto, without departing from the spirit and scope of the invention.

What is claimed is:

1. A process for the removal of mercury and mercury compounds from aqueous solutions, particularly industrial waste liquors, by reduction and filtration, wherein after reduction the liquors are cleared by letting the mercury particles and dirt particles flow into a settling basin, and subsequently subjecting the supernatant aqueous solution from the settling basin to a single depth filtration through a deep filter containing a filtering medium consisting essentially of sand having a grain size of 0.02 mm to 2 mm, whereupon the mercury is returned to the settling basin by reverse rinsing of the filter and is deposited in the settling basin for final removal, the mercury residues remaining in the single and final filtrate amounting to less than 0.05 mg/liter liquor.

2. The process to claim 1, wherein said filtering medium has a particle size of between 0.04 and 0.6 mm.

3. The process according to claim 1, wherein the filtering medium consists of quartz sand.

4. The process according to claim 1, wherein said filtering medium consists of zirconium sand.

5. The process according to claim 1, wherein the filtering medium comprises a plurality of layers of different grain sizes, the uppermost layer having the smallest particles and the bottom layer having the largest particles.

* * * * *

UNITED STATES PATENT AND TRADEMARK OFFICE
CERTIFICATE OF CORRECTION

PATENT NO. : 4,234,422
DATED : November 18, 1980
INVENTOR(S) : Egon Falbesaner et al.

It is certified that error appears in the above—identified patent and that said Letters Patent is hereby corrected as shown below:

Cover Page, (30) Foreign Application Priority Date,

"May 2, 1979" should read -- May 2, 1978 --.

Column 1, line 39, "difficulty" should read -- difficultly --.

Column 4, line 58, after "process" insert -- according --.

Signed and Sealed this

Twenty-third Day of June 1981

[SEAL]

Attest:

RENE D. TEGTMEYER

Attesting Officer     Acting Commissioner of Patents and Trademarks